Dec. 5, 1939.   S. L. LEIBOFF   2,182,564
EXTRACTION PROCESS
Filed July 10, 1937
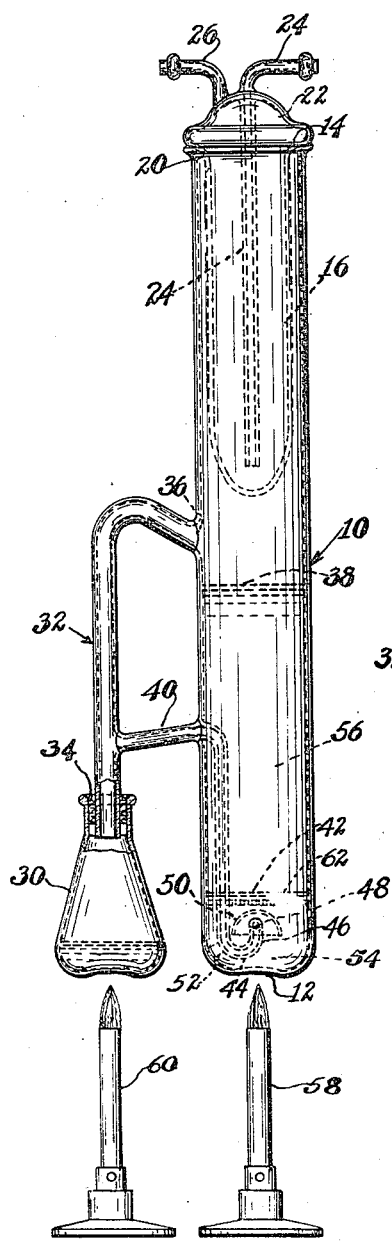
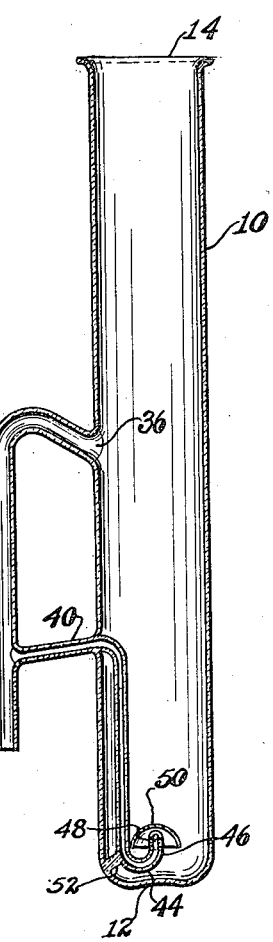
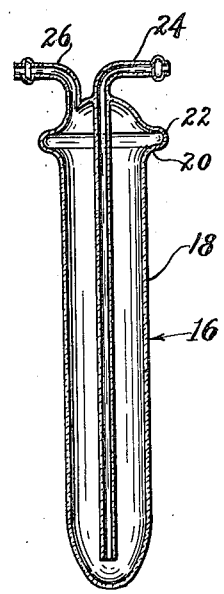
INVENTOR
SAMUEL L. LEIBOFF
BY Harry Cohen
ATTORNEY Patented Dec. 5, 1939

2,182,564

UNITED STATES PATENT OFFICE 2,182,564

EXTRACTION PROCESS

Samuel L. Leiboff, New York, N. Y.

Application July 10, 1937, Serial No. 153,069

4 Claims. (Cl. 167—74)

This invention relates to an extraction process.

In the process of extracting substances from materials containing the same by treating said materials with a solvent for said substances, considerable difficulty is experienced in extracting certain substances from certain materials and considerable time is consumed in obtaining an adequate yield of the extracted substance. This difficulty has been experienced, for example, in extracting sex hormones from female urine. In accordance with the present invention, however, and pursuant to one of the objects thereof, this difficulty is eliminated, and the process which I have developed results in the comparatively rapid extraction from one material of a substantial quantity of substance contained therein.

Also, in accordance with the present invention, and pursuant to another object thereof, there is provided an apparatus which is simple in construction and effective in operation for expediting the extraction of one substance by means of a solvent therefor from a material containing such substance.

A further object of the invention is to inhibit the formation of an emulsion in the liquid during the process of extracting the substance therefrom.

Briefly, and in its more specific aspects, the invention resides in treating a liquid containing a substance to be extracted therefrom with a liquid solvent for such substance which is immiscible with said liquid and has a higher specific gravity and preferably a lower boiling point than the latter and, more particularly, by placing said liquid and solvent within a suitable vessel, heating said solvent to vaporize the same, passing the vapor through the liquid and condensing said vapor in said vessel above the liquid whereby the liquid solvent thus condensed passes by gravity through said liquid and extracts such substance therefrom, and further in withdrawing the solution from the vessel heating the withdrawn solution to vaporize the solvent thereof, passing the last mentioned vapor into said vessel above the liquid therein and condensing the same above the latter whereby the solvent thus condensed passes by gravity through said liquid and extracts more of said substance therefrom. The process is preferably conducted as a continuous process in which the liquid solvent is rapidly vaporized and condensed and the solution continuously withdrawn from the vessel containing the same to another vessel in which the solution is heated for vaporizing the solvent for the return of the latter to said first mentioned vessel to be condensed therein and again passed through the liquid containing the substance to be extracted. While the present process and apparatus are intended primarily for extracting substances from liquid materials, it will be apparent as the description proceeds that the invention is not restricted to the extraction of substances from liquid materials, but may be utilized also for extracting substances from solid materials.

In the drawing:

Fig. 1 is a view in elevation of an extraction apparatus embodying the present invention in accordance with a preferred form thereof;

Fig. 2 is a view in elevation of one of the vessels forming part of the apparatus illustrated in Fig. 1;

Fig. 3 is a view in elevation of the condenser forming part of the apparatus illustrated in Fig. 1.

Referring now more particularly to the drawing, the extraction apparatus here shown comprises a vessel 10 preferably made of transparent glass and provided with a closed bottom 12 and an open top 14 through which the condenser 16 may be inserted and removed. Said condenser is preferably made of glass and comprises in integral sealed and fluid-tight relation a tubular body portion or cooling chamber 18, which has a flaring top portion 20, and a cap 22. An inlet tube 24 for cooling water or other liquid extends through cap 22 into body 18 and terminates near the bottom of the latter. An outlet tube 26 is connected to the top of cap 22. As here shown, body portion 18 of condenser 16 is of smaller diameter than vessel 10 whereby to provide a circumferential space therebetween for substantially the full length of said body portion. When the condenser is assembled with vessel 10, as illustrated in Fig. 1, said condenser closes and seals the top of said vessel by the engagement of flaring top portion 20 of condenser 16 with the upper flaring portion 14 of vessel 10.

Associated with vessel 10 for use in conjunction with the latter during the operation of the process is a vessel 30 which is also preferably made of transparent glass and which is in communication with vessel 10. For this purpose vessel 10 is provided with a tubular portion 32 integral with vessel 10 and connected to vessel 30 through an opening in stopper 34 inserted in the top of vessel 30. The opening 36 between tube 32 and vessel 10 is disposed so that it is normally above the liquid level indicated in dotted lines designated by the reference numeral 38. Communication between vessel 10 and vessel 30 is also provided by means of a tube 40 which, as here shown, is integral with and opens into tube 32 adjacent the free end thereof. Tube 40 is integral with and passes through the side wall of vessel 10 and extends to a point below the liquid level indicated by the dotted lines designated by the reference numeral 42. The lower end 44 of tube 40 terminates close to the bottom 12 of vessel 10 and has a short upturned portion 46 provided with a plurality of small circumferentially spaced openings 48 for the passage of liquid therethrough and into said tube. A guard or screen 50 which may be constituted by an imperforate enlargement formed at the end of said upturned portion is provided for the purpose of preventing pieces of solid material from clogging openings 48. The lower end of tube 40 may be secured to the inner surface of vessel 10 adjacent the bottom thereof by a glass link 52 fused to vessel and tube.

In utilizing the present apparatus for carrying out the extraction process in accordance with this invention, a suitable quantity of liquid solvent 54 is placed within vessel 10. Said solvent should be a solvent for the substance which is to be extracted from the mother material and when the latter is a liquid, said solvent should have a higher specific gravity than the mother liquid and should preferably boil at a lower temperature. For extracting sex hormones from female urine, chloroform is the preferred solvent. After the solvent is placed within the vessel 10 a quantity 56 of the liquid or material containing the substance to be extracted is placed in said vessel and when the latter is a liquid the level 38 thereof is below the opening 36 of tube 32. As the liquid solvent is heavier than the liquid to be treated thereby, and as said liquids are not miscible, they stratify as indicated by the lines 42 and 38 denoting the liquid levels.

After the liquid solvent and the material containing the substance to be extracted have been placed in vessel 10, condenser 16 is inserted and vessel 30 having a quantity of the liquid solvent therein is connected to tube 32. During the operation of the process, cooling water or other liquid is passed through condenser 16 by connecting pipes 24 and 26 to a water supply and to a waste conduit, respectively, so that cooling liquid circulates continuously through condenser 16. During the operation of the process heat is applied to the bottoms of vessels 10 and 30 in any suitable manner, here shown more or less diagrammatically by burners 58 and 60, respectively.

During the process, heat is applied both to vessel 10 and to vessel 30 whereby to simultaneously vaporize the liquid solvents contained in said vessels. As the liquid solvent in vessel 10 is vaporized, said vapors pass upwardly through the body of liquid 56 to the upper portion of said vessel above said liquid level where they are subjected to the action of condenser 16 and are liquified. The solvent thus condensed then passes by gravity in a reverse direction through liquid 56 to the bottom of vessel 10. In the meantime the solvent in vessel 30 is vaporized by the heat applied by burner 50 and passes through tube 32 into vessel 10 above the liquid level 38 therein in the region of condenser 16 and is thus condensed and passes by gravity through liquid 56. In passing through liquid 56, said solvent dissolves the substance to be extracted from said liquid and the solution thus formed passes into tube 40 through the openings 48 and by way of said tube into vessel 30. In this manner a continuous circulation takes place as long as the liquid solvent in vessel 10 and in vessel 30 is vaporized, the solution passing from the bottom of vessel 10 through tube 40 into vessel 30 and the vapor passing from vessel 30 through tube 32 into vessel 10. Vapors also pass from the bottom of vessel 10 upwardly through the body of liquid 56 where they are condensed together with the vapors from vessel 30 for downward circulation of the condensed solvent through the liquid undergoing the extraction treatment.

In carrying out the present process, I have discovered that it is desirable to provide means for inhibiting the formation of an emulsion which tends to occur by the action of the solvent on the mother liquid. For this purpose I have utilized small pieces of filter paper indicated by the reference numeral 62 which are placed in the liquid at the start of the process. These small pieces of filter paper prevent the formation of an emulsion or other thick sludge condition which occurred without the use of such filter paper especially when subjecting urine to the action of chloroform for extracting sex hormones.

While the present apparatus and process is intended primarily for use in extracting substances from liquids in which such substances are contained, and particularly fatty substances, such as sex hormones from urine and blood, the apparatus and process may be utilized generally for extracting one substance from another whether the latter is liquid or solid, by means of a solvent for such substance. When the mother material is solid it may be placed in the contained within a perforate container such as a bag having holes therethrough for the passage of the liquid solvent. Other adaptations of the present apparatus and process will occur to those skilled in the art and various changes in the construction and arrangement of the apparatus and parts thereof and in the manner of performing the process will occur to those skilled in the art. Therefore, I do not wish to be limited precisely to the present process or apparatus or to either of them, except as may be required by the appended claims considered with reference to the prior art, and unless otherwise specified the steps in the process may be performed in a sequence which differs from their order of recitation in the claims.

Having thus described my invention, what I claim and desire to secure by Letters Patent is:

1. An extraction process according to which a liquid containing a substance to be extracted is treated with a solvent for said substance, which method comprises placing in a first vessel a quantity of said liquid and a quantity of a liquid solvent for said substance, which solvent is immiscible with said liquid and has a higher specific gravity and a lower boiling point than the latter, placing a quantity of said liquid solvent in another vessel, heating said solvents in both vessels whereby said solvents are vaporized and the vaporized solvent in said first vessel passes upwardly through said liquid containing the substance to be extracted, passing the vapor from said other vessel into said first vessel above the liquid therein, condensing the vapors in said first vessel above said liquid therein whereby the solvent thus condensed passes by gravity through said liquid and forms a solution of said substance, and withdrawing said solution of the extracted substance from said first vessel into said other vessel.

2. An extraction process according to which a liquid containing a substance to be extracted is treated with a solvent for said substance, which method comprises placing in a first vessel a quantity of said liquid and a quantity of a liquid solvent for said substance, which solvent is immiscible with said liquid and has a higher specific gravity and a lower boiling point than the latter, placing a quantity of said liquid solvent in another vessel, heating said solvents in both vessels, passing the vapor from said other vessel into said first vessel above the liquid therein, condensing the vapors in said first vessel above said liquid therein whereby the solvent thus condensed passes by gravity through said liquid and forms a solution of said substance, and continuously passing said solution of the extracted substance from said first vessel into said other vessel while vaporizing the solvent in the latter and without interrupting the process.

3. An extraction process according to which a liquid containing a substance to be extracted is treated with a solvent for said substance, which method comprises placing in a first vessel a quantity of said liquid and a quantity of a liquid solvent for said substance, which solvent is immiscible with said liquid and has a higher specific gravity and a lower boiling point than the latter, placing a quantity of said liquid solvent in another vessel, heating said solvents in both vessels whereby said solvents are vaporized and the vaporized solvent in said first vessel passes upwardly through said liquid containing the substance to be extracted, passing the vapor from said other vessel into said first vessel above the liquid therein, condensing the vapors in said first vessel above said liquid therein whereby the solvent thus condensed passes by gravity through said liquid and forms a solution of said substance, passing said solution of the extracted substance from said first vessel into said other vessel while vaporizing the solvent in the latter and without interrupting the process, and continuing the vaporization of said solvent in both vessels simultaneously until the desired quantity of said substance is extracted from said liquid.

4. A process of extracting sex hormones from urine according to which the urine is treated in a vessel with a solvent for said hormones, which method comprises heating in the presence of the urine a liquid solvent in said vessel to form a vapor thereof which passes upwardly through said urine, said solvent having a specific gravity which is higher and a boiling point which is lower than the urine, condensing the vapors above the level of the urine whereby the condensed solvent passes through said urine and forms a solution of said hormones, withdrawing said solution from said vessel, heating said withdrawn solution in a second vessel thereby vaporizing the solvent of said withdrawn solution, passing said last mentioned vapors from said second vessel to said first vessel and condensing same above the urine whereby said last mentioned condensed solvent passes through said urine and forms additional solution of said hormones, and continuing the heating of said solvent in the first vessel while the condensed vapor from said second vessel passes through said urine.

SAMUEL L. LEIBOFF.